US010819072B2

(12) United States Patent
Suda et al.

(10) Patent No.: US 10,819,072 B2
(45) Date of Patent: Oct. 27, 2020

(54) CONNECTOR CAGE AND CONNECTOR INCLUDING SAME

(71) Applicant: JAPAN AVIATION ELECTRONICS INDUSTRY, LIMITED, Shibuyaku, Tokyo (JP)

(72) Inventors: Yuki Suda, Tokyo (JP); Yukitaka Tanaka, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 16/251,543

(22) Filed: Jan. 18, 2019

(65) Prior Publication Data

US 2019/0363496 A1 Nov. 28, 2019

(30) Foreign Application Priority Data

May 22, 2018 (JP) ................................ 2018-097586

(51) Int. Cl.
*H01R 13/648* (2006.01)
*H01R 13/6594* (2011.01)
*G02B 6/42* (2006.01)
*H01R 13/518* (2006.01)
*H01R 13/6582* (2011.01)

(52) U.S. Cl.
CPC ....... *H01R 13/6594* (2013.01); *G02B 6/4277* (2013.01); *H01R 13/518* (2013.01); *H01R 13/6582* (2013.01)

(58) Field of Classification Search
CPC ............ H01R 13/6594; H01R 13/6582; H01R 13/518; H01R 13/6583; H01R 43/18; G02B 6/4277; H05K 9/0058; H05K 9/0009

USPC .................................................... 439/607.01
See application file for complete search history.

(56) References Cited

U.S. PATENT DOCUMENTS 8,182,291 B2 * 5/2012 Tsou ...................... H01R 43/18
                                                                       439/607.55
9,831,614 B2    11/2017 Khazen et al.
10,104,793 B2 * 10/2018 Briant .................. H05K 9/0009
(Continued)

FOREIGN PATENT DOCUMENTS

TW           254492        8/1995
TW        201001831 A      1/2010

OTHER PUBLICATIONS

Taiwanese Office Action dated Apr. 29, 2020 (and English translation thereof) issued in Taiwanese Application No. 108100789.

*Primary Examiner* — Jean F Duverne
(74) *Attorney, Agent, or Firm* — Holtz, Holtz & Volek PC

(57) ABSTRACT

A connector cage that makes a spring member difficult to be broken when a mating connector is fitted. The connector cage includes a cage body that has a reception portion for receiving a mating connector therein, a partition member that partitions the reception portion in a left-right direction of the cage body, and a spring member that is arranged at a front end of the partition member in a front-rear direction, and is brought into contact with the mating connector. A first hole is formed which is a through hole extending through the cage body in an up-down direction. The spring member includes a spring member-side protruding portion which is inserted through the first hole, and is connected to the cage body.

20 Claims, 15 Drawing Sheets

(56) References Cited

U.S. PATENT DOCUMENTS

2006/0003632 A1\* 1/2006 Long .................... H05K 9/0058
439/607.2

\* cited by examiner

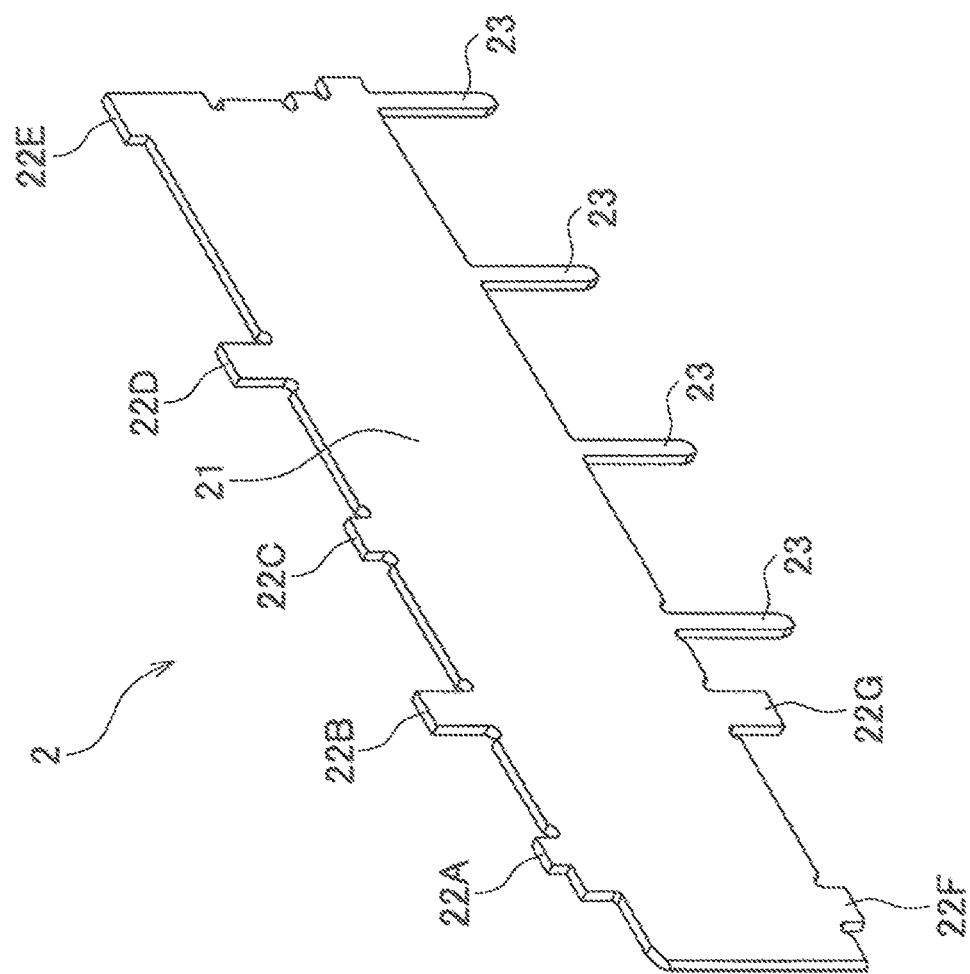

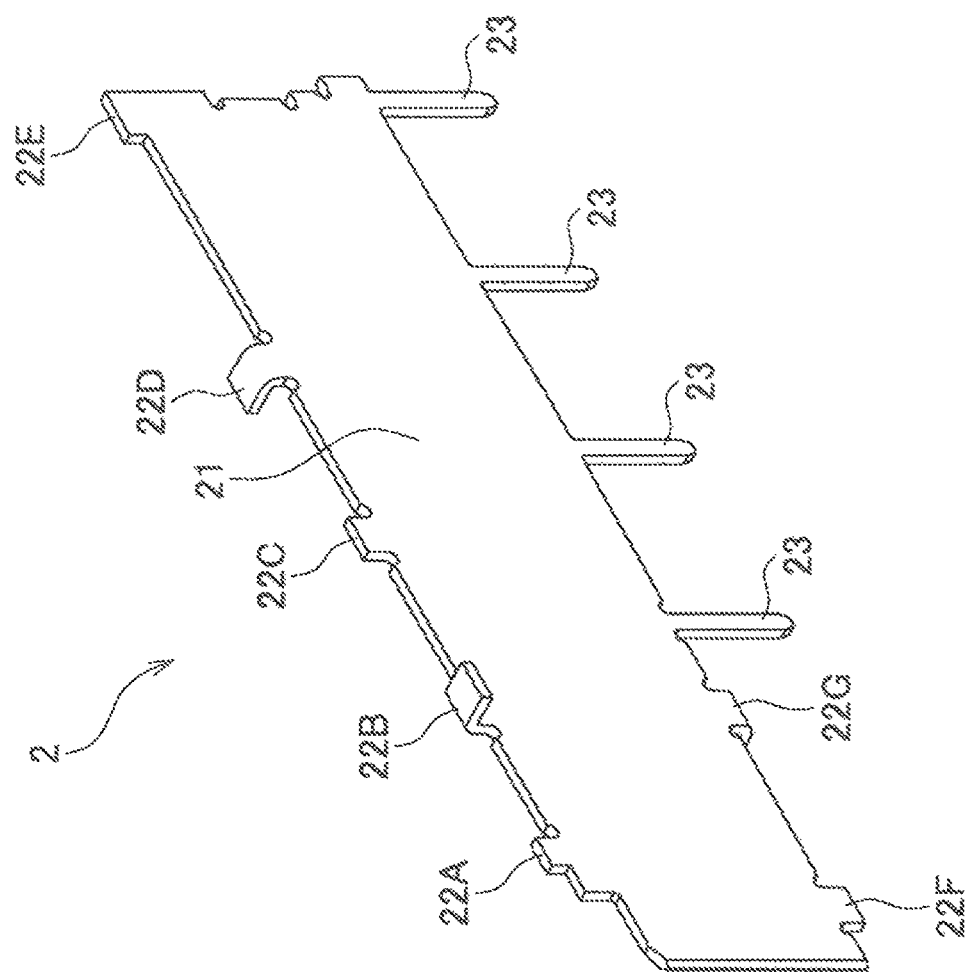

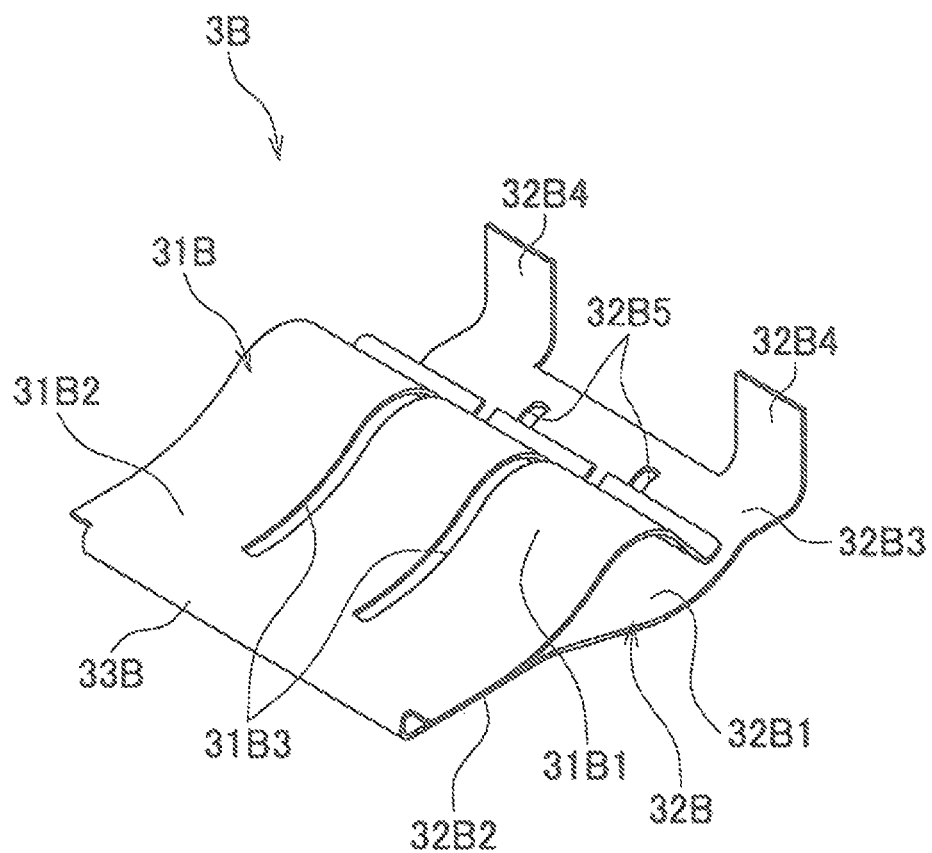

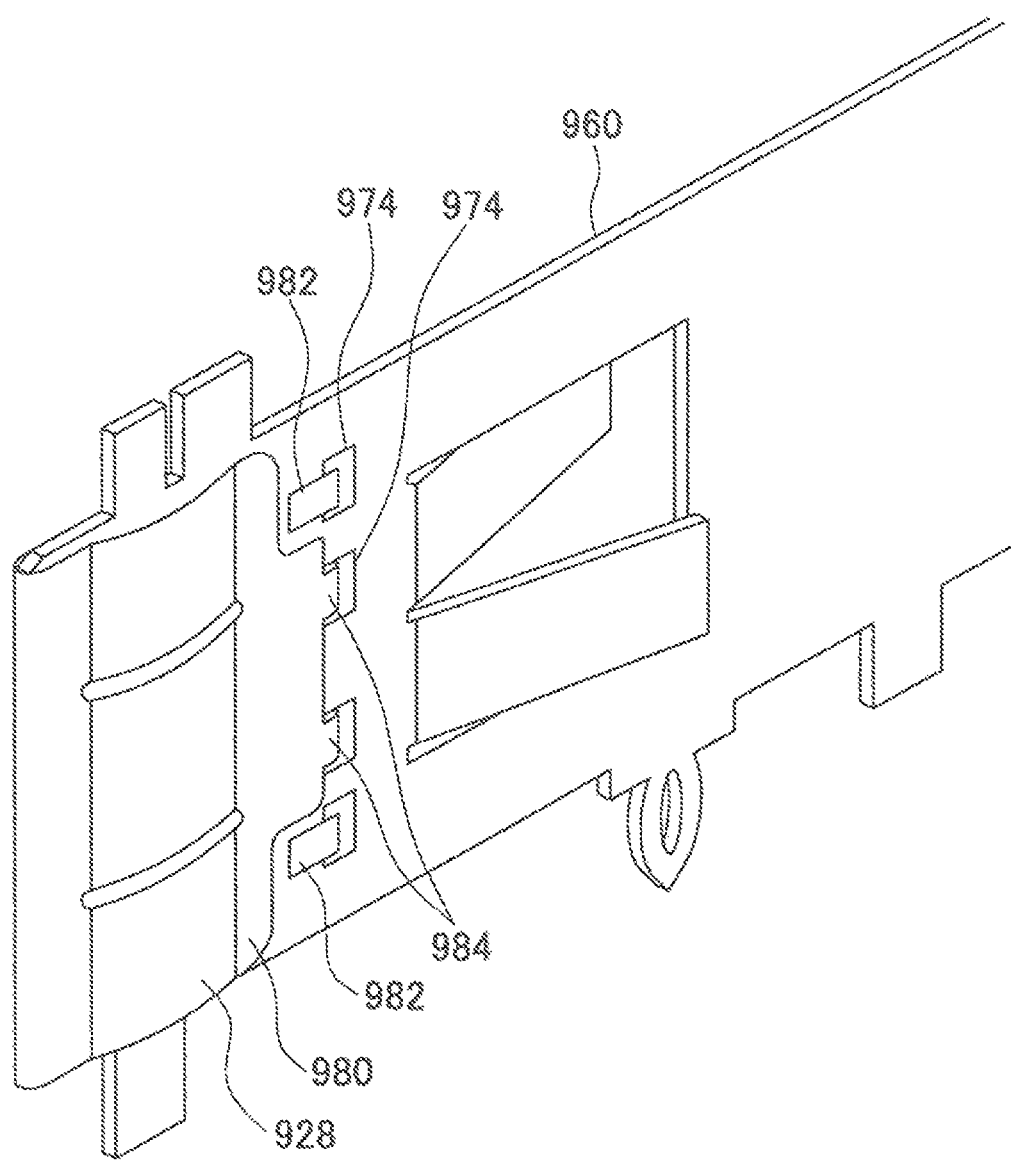

CONNECTOR CAGE AND CONNECTOR INCLUDING SAME

BACKGROUND OF THE INVENTION

Field of the Invention

This invention relates to a connector cage and a connector including the same.

Description of the Related Art

Conventionally, there has been known a connector cage shown in FIG. 10 (see U.S. Pat. No. 9,831,614).

In this connector cage, a spring assembly 928 is fixed to a partition wall 960 by inserting tabs 982 and 984 through slots 974 of the partition wall 960, respectively, and folding back the tabs 982 and 984.

However, the connector cage shown in FIG. 10 has the tabs 982 and 984 folded back toward a mating connector, and hence there is a problem that when the mating connector is fitted in the connector cage, the mating connector may be caught by distal ends of the tabs 982 and 984, causing breakage of the spring assembly 928.

SUMMARY OF THE INVENTION

The present invention has been made in view of these circumstances, and an object thereof is to make a spring member difficult to be broken when a mating connector is fitted.

To attain the above object, in a first aspect of the present invention, there is provided a connector cage, comprising a cage body that has a reception portion for receiving a mating connector therein, a partition member that partitions the reception portion in a left-right direction which is orthogonal to a front-rear direction of the cage body, and a spring member that is arranged at a front end of the partition member in the front-rear direction, and is brought into contact with the mating connector, wherein a first hole is formed which is a through hole extending through the cage body in an up-down direction which is orthogonal to both of the front-rear direction and the left-right direction, and wherein the spring member includes a spring member-side protruding portion which is inserted through the first hole, and is connected to the cage body.

Preferably, a distal end of the spring member-side protruding portion, which protrudes from the first hole out of the cage body, is bent.

Preferably, a second hole is formed which is a through hole extending through the cage body in the up-down direction, and the partition member includes a partition member-side first protruding portion which is inserted through the second hole, and is connected to the cage body.

More preferably, a distal end of the partition member-side first protruding portion, which protrudes from the second hole out of the cage body, is bent.

Preferably, the partition member includes a partition member-side second protruding portion which is inserted through the first hole together with the spring member-side protruding portion, and is connected to the cage body.

More preferably, the partition member-side second protruding portion is overlaid on the spring member-side protruding portion.

Further preferably, when the cage body is viewed from the up-down direction, the spring member-side protruding portion cannot be visually recognized.

More preferably, the cage body includes an upper wall and a lower wall, and the first hole and the second hole are formed in at least one of the upper wall and the lower wall.

Preferably, the spring member includes a first spring part and a second spring part, which are opposed to each other with the partition member therebetween, and the spring member-side protruding portion formed on one of the first spring part and the second spring part extends upward in the up-down direction, and the spring member-side protruding portion formed on the other of the same extends downward in the up-down direction.

More preferably, the first spring part and the second spring part each include a contact portion that is brought into contact with the mating connector, and a flat portion which is continuous with a rear end of the contact portion in the front-rear direction, and the spring member-side protruding portion is continuous with the flat portion.

To attain the above object, in a second aspect of the present invention, there is provided a connector including the connector cage described above.

According to the present invention, it is possible to make the spring member difficult to be broken when a mating connector is fitted.

The above and other objects, features and advantages of the present invention will become more apparent from the following detailed description taken in conjunction with the accompanying drawings.

BRIEF DESCRIPTION OF THE DRAWINGS

FIG. 5A is a perspective view of a partition member of the connector cage shown in FIG. 1, showing a state before bending partition member-side protruding portions.

FIG. 5B is a perspective view of the partition member of the connector cage shown in FIG. 1, showing a state after bending some of the partition member-side protruding portions.

FIG. 8A is an enlarged perspective view of a spring member fitted on the cage body of the connector cage shown in FIG. 1, showing a state before bending spring member-side protruding portions thereof.

FIG. 10 is a perspective view of a spring assembly of a conventional connector cage, in a state fixed to a partition wall.

DETAILED DESCRIPTION OF THE PREFERRED EMBODIMENT

The present invention will now be described in detail with reference to the drawings showing preferred embodiments thereof.

First, a description will be given of a connector cage according to an embodiment of the present invention with reference to FIGS. 1 to 8.

Figure 1:
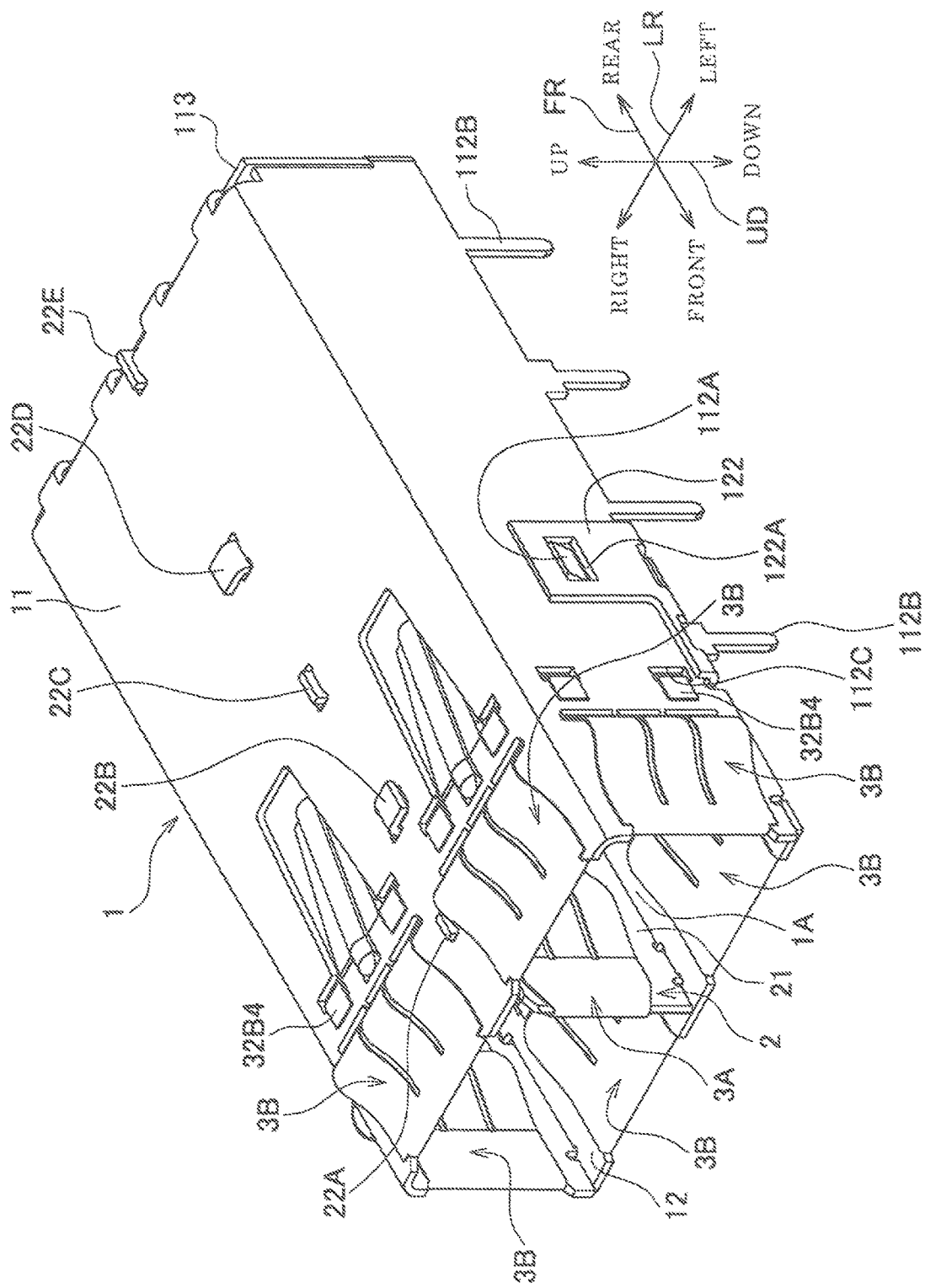
FIG. 1 is a perspective view of a connector cage according to an embodiment of the present invention.
Figure 2:
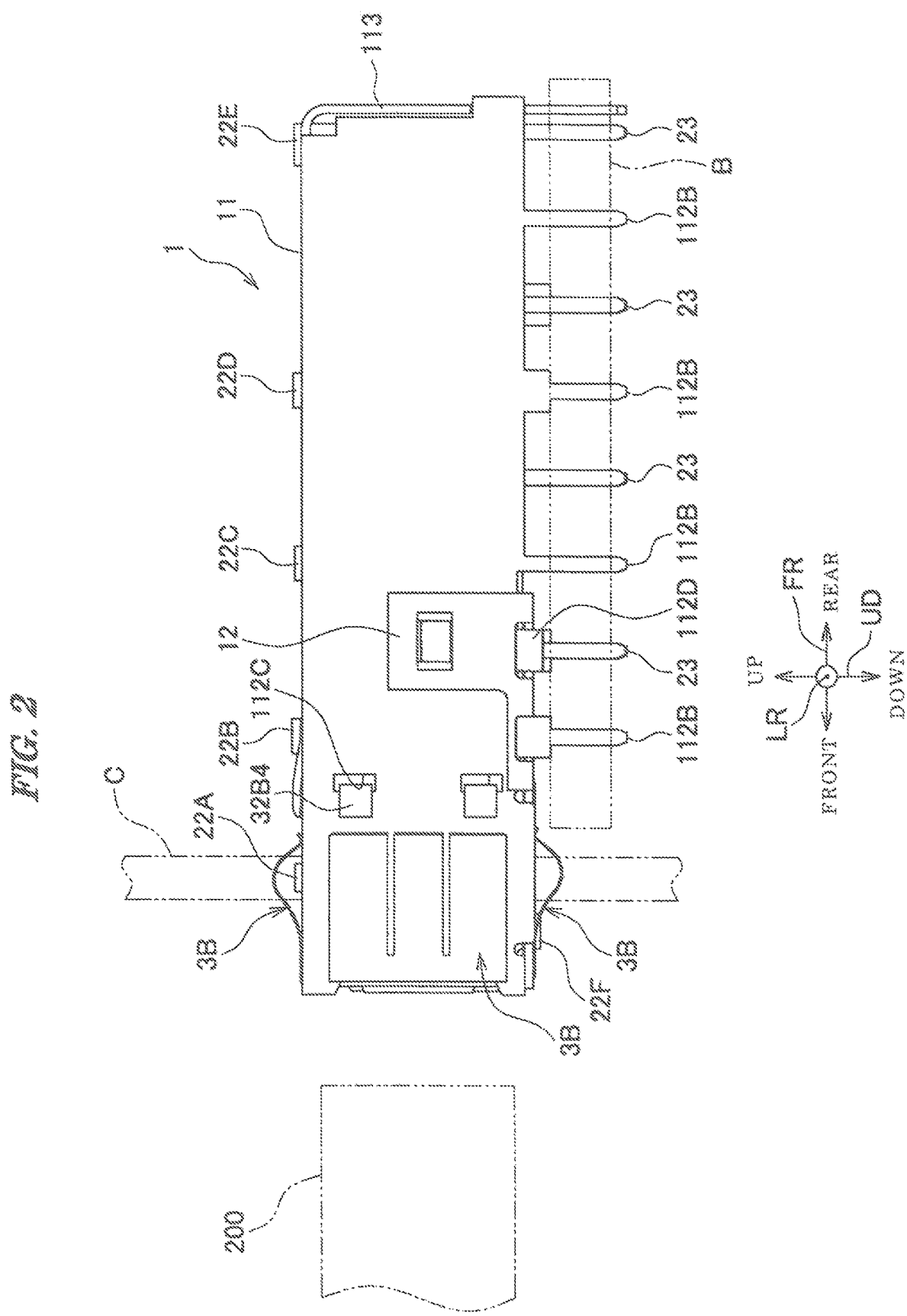
FIG. 2 is a side view of the connector cage shown in FIG. 1.

As shown in FIGS. 1 and 2, the connector cage includes a cage body 1 having a reception portion 1A for receiving a mating connector 200 therein, a partition member 2 which partitions the reception portion 1A, and spring members 3A and 3B which are brought into contact with the mating connector 200 inserted in the reception portion 1A. The cage body 1, the partition member 2, and the spring members 3A and 3B are all made of metal and are formed by press processing.

The partition member 2 partitions the reception portion 1A in a left-right direction LR of the cage body 1. The left-right direction LR is a direction orthogonal to both of a front-rear direction FR of the cage body 1, and an up-down direction UD of the cage body 1, which is orthogonal to the front-rear direction FR. A connector is formed by assembling contact members, not shown, into this connector cage.

The cage body 1 has a tubular shape, and has a rectangular cross section. The cage body 1 is formed by an upper cage part 11 and a lower cage part 12. A space surrounded by the upper cage part 11 and the lower cage part 12 is the reception portion 1A.

Figure 3:
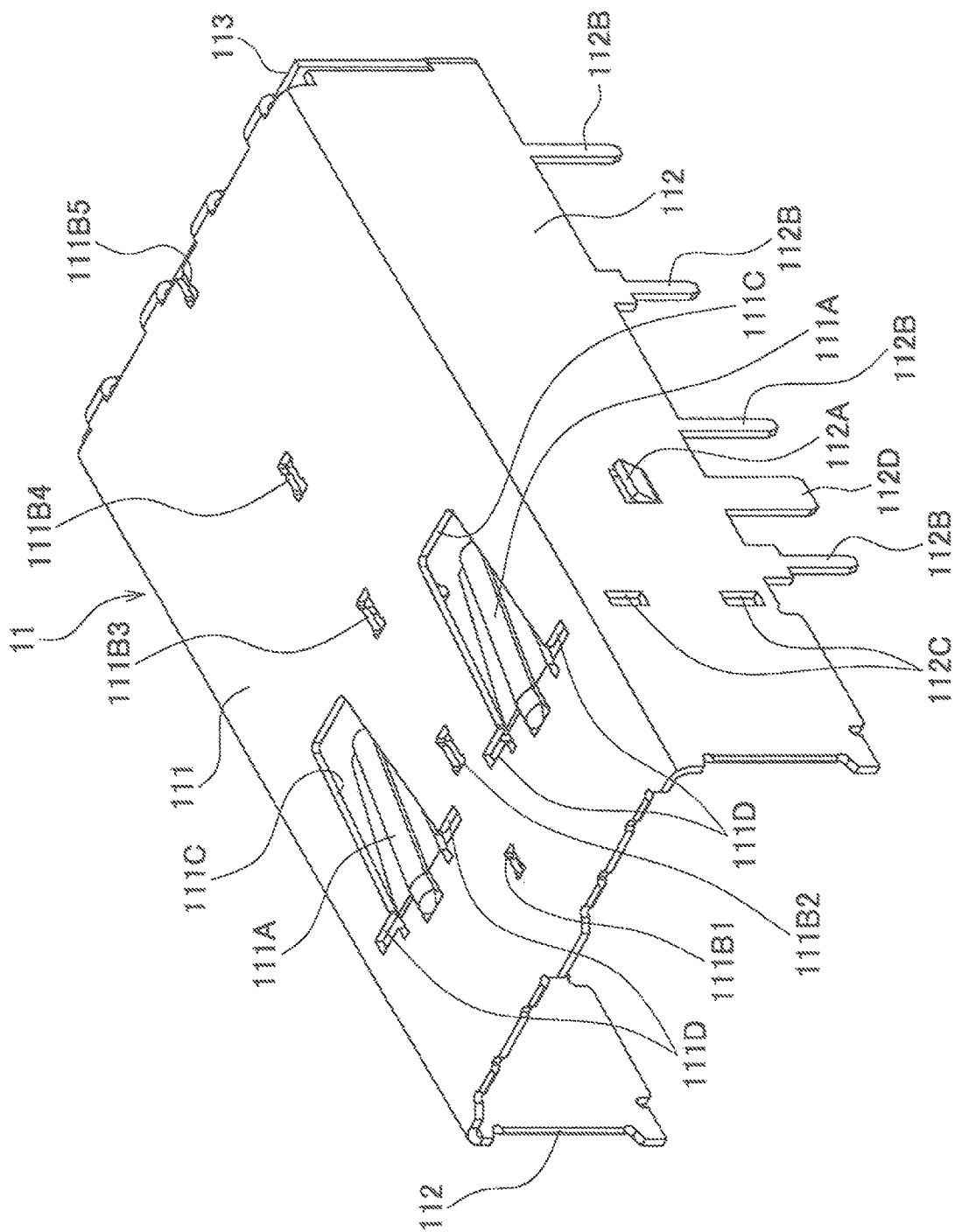
FIG. 3 is a perspective view of an upper cage part of a cage body of the connector cage shown in FIG. 1.

As shown in FIG. 3, the upper cage part 11 includes an upper surface portion (upper wall) 111, a pair of side surface portions 112, and a rear surface portion 113.

The upper surface portion 111 has two spring pieces 111A, five holes 111B1 to 111B5, two openings 111C, and four holes 111D.

The two spring pieces 111A and the two openings 111C are arranged side by side in the left-right direction LR, respectively. Each spring piece 111A is a cantilever spring piece for pressing the mating connector 200 downward in the up-down direction UD. The spring piece 111A extends from the front side to the rear side in the front-rear direction FR, and is inclined obliquely downward with respect to the upper surface portion 111.

The five holes 111B1 to 111B5 are arranged in a line in the front-rear direction FR. The holes 111B1, and 111B3 to 111B5 out of the five holes 111B1 to 111B5 are holes (second holes) in which partition member-side protruding portions (partition member-side first protruding portions) 22A, and 22C to 22E (see FIG. 5A) are inserted, respectively. The hole 111B2 out of the five holes 111B1 to 111B5 is a hole (first hole) through which a spring member-side protruding portion 31A4 (see FIG. 6A) is inserted and a partition member-side protruding portion (partition member-side second protruding portion) 22B is also inserted.

The four holes 111D are arranged in a line in the left-right direction LR. The four holes 111D communicate with the openings 111C, respectively. The holes 111D are holes through which spring member-side protruding portions 32B4 (see FIG. 8A) of associated ones of the spring members 3B are inserted.

The pair of side surface portions 112 are each bent substantially at right angles to the upper surface portion 111. The pair of side surface portions 112 each have one connection protruding portion 112A, four leg portions 112B, two holes 112C, and one protruding portion 112D.

The connection protruding portion 112A protrudes outward of the associated side surface portion 112, and extends obliquely upward.

The four leg portions 112B are arranged in a line in the front-rear direction FR. The four leg portions 112B each extend downward from a lower end of the associated side surface portion 112, and are mounted on a substrate B.

The protruding portion 112D extends downward from the lower end of the associated side surface portion 112. When assembling the connector cage, the protruding portion 112D is inserted through a hole 121C2 of the lower cage part 12, and is bent substantially at right angles (see FIG. 2).

The two holes 112C are arranged in a line in the up-down direction UD. The holes 112C are holes through which the spring member-side protruding portions 32B4 (see FIG. 8A) of an associated one of the spring members 33 are inserted, respectively.

Figure 4:
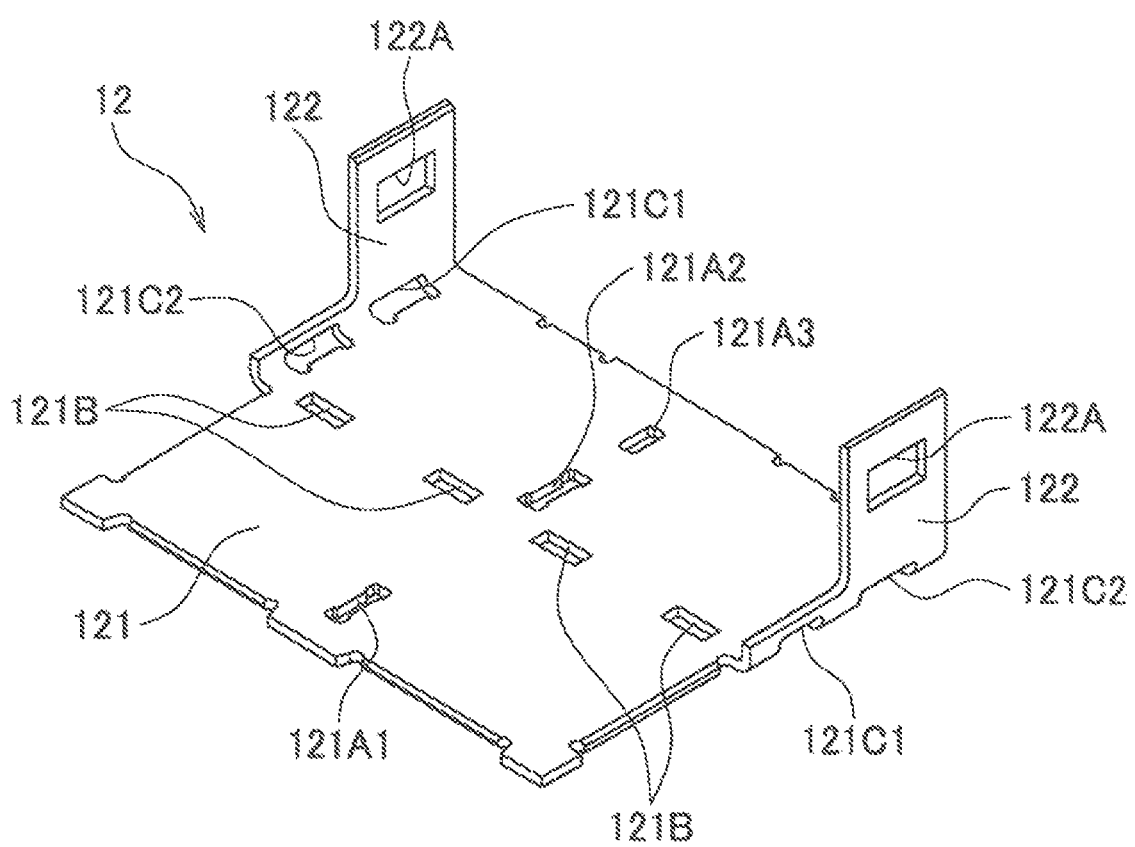
FIG. 4 is a perspective view of a lower cage part of the cage body of the connector cage shown in FIG. 1.

As shown in FIG. 4, the lower cage part 12 includes a lower surface portion (lower wall) 121 and two connection protruding portions 122.

The lower surface portion 121 has three holes 121A1 to 121A3, four holes 121B, two holes 121C1, and two holes 121C2.

The three holes 121A1 to 121A3 are arranged in a line in the front-rear direction FR. The hole 121A1 out of the three holes 121A1 to 121A3 is a hole (second hole) in which a partition member-side protruding portion (partition member-side first protruding portion) 22F (see FIG. 5A) is inserted. The hole 121A2 out of the three holes 121A1 to 121A3 is a hole (first hole) through which a spring member-side protruding portion 32A4 (see FIG. 6A) is inserted, and a partition member-side protruding portion (partition member-side second protruding portion) 22G is also inserted. The hole 121A3 out of the three holes 121A1 to 121A3 is a hole in which one of leg portions 23 of the partition member 2 (see FIG. 5A) is inserted.

The four holes 121B are arranged in a line in the left-right direction LR. The four holes 121B are holes through which the spring member-side protruding portions 32B4 (see FIG. 8A) are inserted, respectively.

The holes 121C1 and 121C2 are arranged in a line in the front-rear direction FR. The hole 121C1 is a hole in which one of the leg portions 112B of the associated side surface portion 112 is inserted, and the hole 121C2 is a hole through which the protruding portion 112D of the associated side surface portion 112 is inserted.

The two connection protruding portions 122 are bent substantially at right angles to the lower surface portion 121. The two connection protruding portions 122 each have a hole 122A for receiving an associated one of the connection protruding portions 112A of the upper cage part 11. The holes 122A of the connection protruding portions 122 can be hooked on the connection protruding portions 112A of the upper cage part 11, respectively, and hence it is possible to connect the upper cage part 11 and the lower cage part 12.

As shown in FIG. 5A, the partition member 2 includes a substantially rectangular partition body 21, seven partition member-side protruding portions 22A to 22G, and the four leg portions 23 that are mounted on the substrate B.

The partition member-side protruding portions 22A to 22E out of the seven partition member-side protruding portions 22A to 22G each extend upward from an upper end of the partition body 21. The partition member-side protruding portions 22A to 22E are arranged in a line in the front-rear direction FR.

The partition member-side protruding portions 22A, 22B, 22C, 22D, and 22E are inserted in the holes 111B1, 111B2, 111B3, 111B4, and 111B5 of the upper cage part 11, respectively.

The partition member-side protruding portions 22F and 22G out of the seven partition member-side protruding portions 22A to 22G each extend downward from a lower end of the partition body 21. The partition member-side protruding portions 22F and 22G are arranged in a line in the front-rear direction FR.

The partition member-side protruding portions 22F and 22G are inserted in the holes 121A1 and 121A2 of the lower cage part 12, respectively.

The length of the partition member-side protruding portions 22A, 22C, 22E, and 22F in the up-down direction UD in slightly longer than the length of the holes 111B1 to 111B5 of the upper cage part 11 and the holes 121A1 to 121A3 of the lower cage part 12 in the up-down direction UD. The length of the partition member-side protruding portions 22B, 22D, and 22G in the up-down direction UD is longer than the length of the partition member-side protruding portions 22A, 22C, 22E, and 22F in the up-down direction UD, and when assembling the connector cage, the partition member-side protruding portions 22B and 22D are inserted through the holes 111B2 and 111B4 of the upper cage part 11, and bent substantially at right angles (see FIG. 5B), and the partition member-side protruding portion 22G is inserted through the hole 121A2 of the lower cage part 12, and bent substantially at right angles (see FIG. 5B).

The four leg portions 23 each extend downward from the lower end of the partition body 21. The four leg portions 23 are arranged in the front-rear direction FR. The four leg portions 23 are located rearward of the partition member-side protruding portions 22F and 22G in the front-rear direction FR.

In the present embodiment, as shown in FIG. 1, one spring member 3A and six spring members 3B are used. The spring member 3A is fitted on a front end of the partition body 21 of the partition member 2. Two of the spring members 3B are fitted on a front end of the upper surface portion 111, one of the spring members 3B is fitted on o front end of one of the side surface portions 112, one of the spring members 3B is fitted on a front end of the other of the side surface portions 112, and two of the spring members 3B are fitted on a front end of the lower surface portion 121.

Figure 6A:
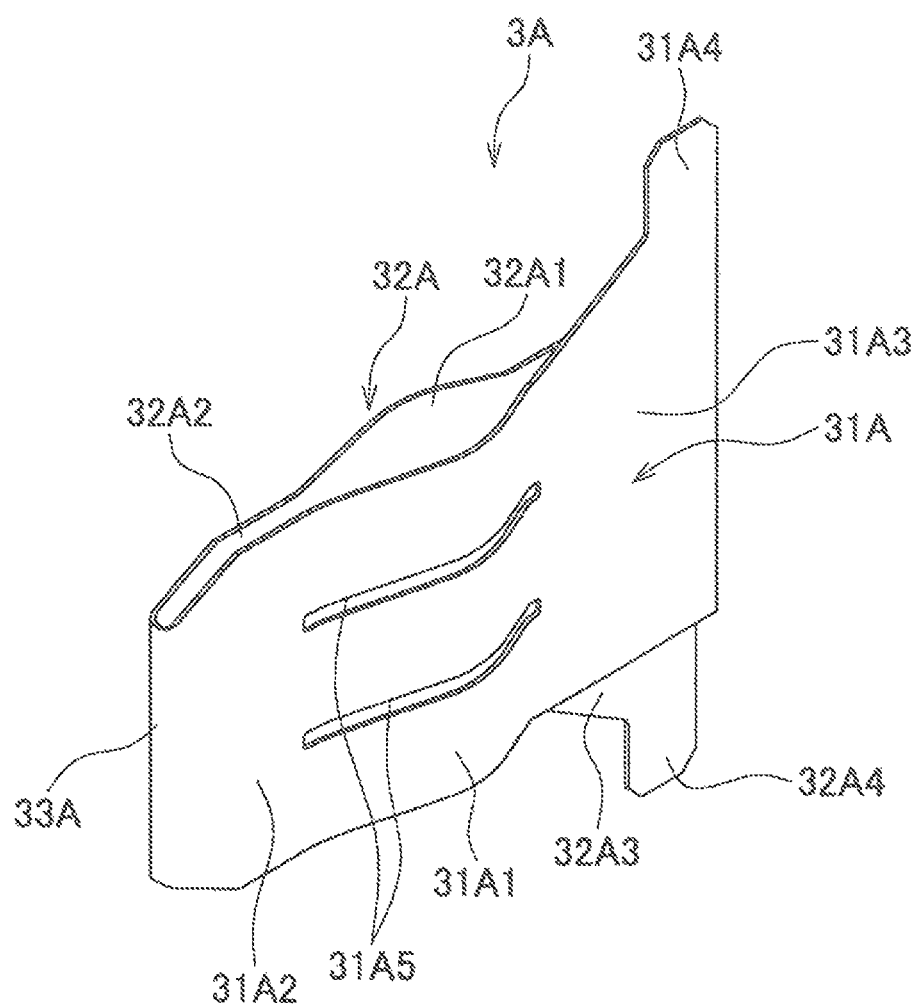
FIG. 6A is an enlarged perspective view of a spring member fitted on the partition member of the connector cage shown in FIG. 1, showing a state before bending spring member-side protruding portions thereof.
Figure 7A:
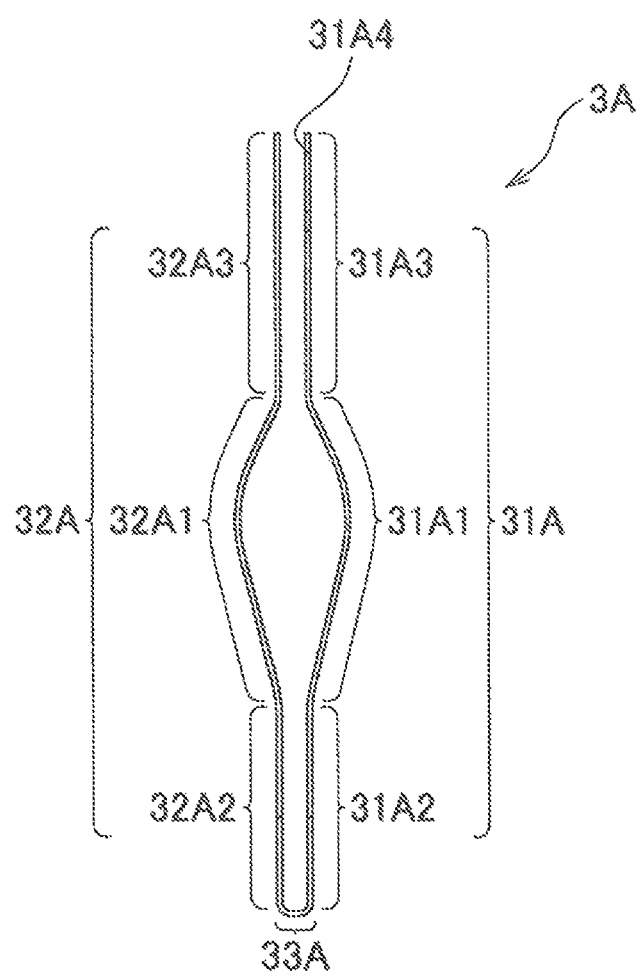
FIG. 7A is a plan view of the spring member shown in FIG. 6A.
Figure 7B:
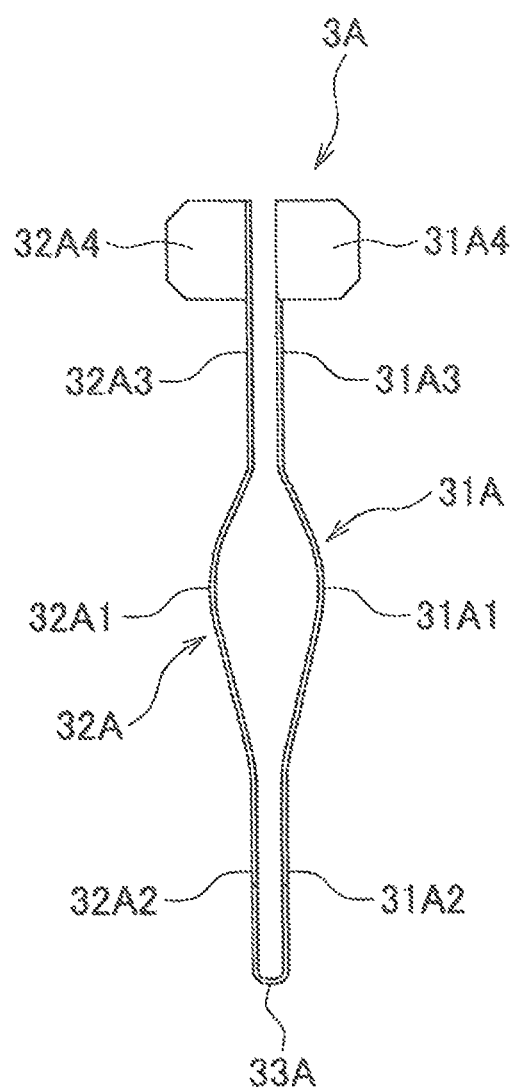
FIG. 7B is a plan view of the spring member shown in FIG. 6B.

As shown in FIGS. 6A and 7A, the spring member 3A includes a first spring part 31A, a second spring part 32A, and a connection part 33A. The first spring part 31A and the second spring part 32A are opposed to each other. The connection part 33A connects the first spring part 31A and the second spring part 32A.

The first spring part 31A includes a contact portion 31A1 having a curved shape, which is brought into contact with the mating connector 200, a flat portion 31A2 which is continuous with a front end of the contact portion 31A1, a flat portion 31A3 which is continuous with a rear end of the contact portion 31A1, and the spring member-side protruding portion 31A4 which is continuous with a rear end of the flat portion 31A3. The contact portion 31A1 is formed with two slots 31A5 extending in the front-rear direction FR. The spring member-side protruding portion 31A4 extends upward in the up-down direction UD.

The second spring part 32A includes a contact portion 32A1 having a curved shape, which is brought into contact with the mating connector 200, a flat portion 32A2 which is continuous with a front end of the contact portion 32A1, a flat portion 32A3 which is continuous with a rear end of the contact portion 32A1, and the spring member-side protruding portion 32A4 which is continuous with a rear end of the flat portion 32A3. The contact portion 32A1 is formed with two slots extending in the front-rear direction FR (these holes are obstructed by the first spring part 31A, and are not viewed in FIG. 6A). The spring member-side protruding portion 32A4 extends downward in the up-down direction UD.

A front end of the flat portion 31A2 and a front end of the flat portion 32A2 are connected via the connection part 33A, and the spring member 3A functions as a clip-type leaf spring.

The lengths of the spring member-side protruding portions 31A4 and 32A4 in the up-down direction UD are longer than the those of the hole 111B2 of the upper cage part 11 and the hole 121A2 of the lower cage part 12 in the up-down direction UD. When assembling the connector cage, the spring member-side protruding portion 31A4 is inserted through the hole 111B2 of the upper cage part 11, and a distal end of the spring member-side protruding portion 31A4, protruding from the hole 111B2, is bent substantially at right angles (see FIGS. 6B and 7B), and the spring member-side protruding portion 32A4 is inserted through the hole 121A2 of the lower cage part 12, and a distal end of the spring member-side protruding portion 32A4, protruding from the hole 121A2, is bent substantially at right angles (see FIGS. 6B and 7B).

Figure 8B:
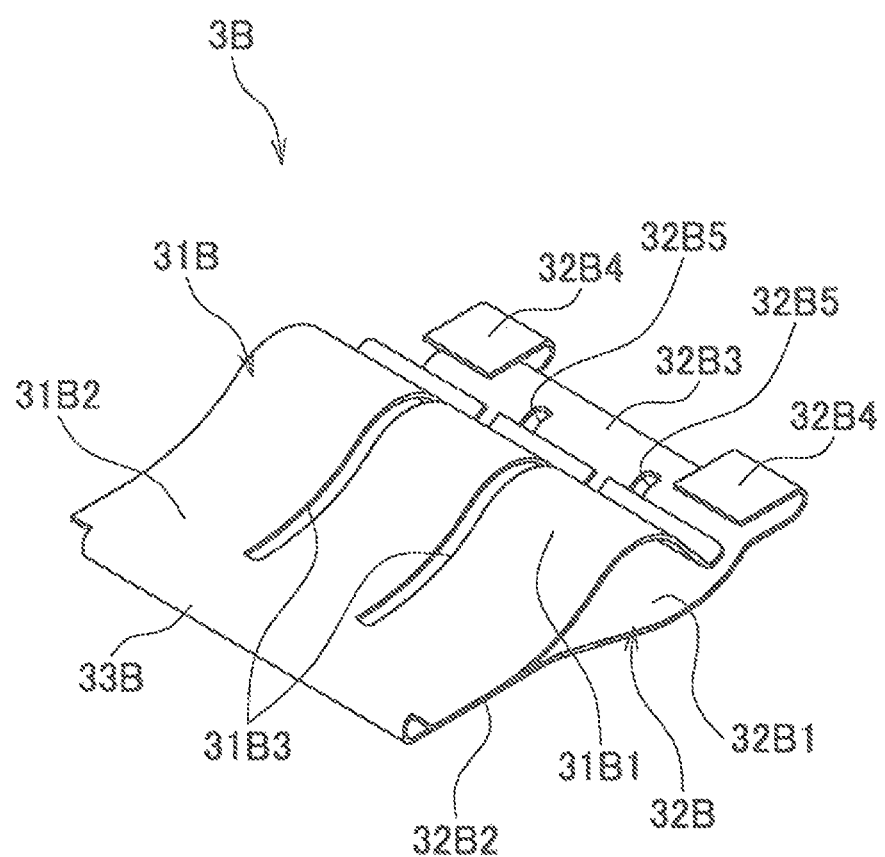
FIG. 8B is an enlarged perspective view of the spring member fitted on the cage body of the connector cage shown in FIG. 1, showing a state after bending the spring member-side protruding portions thereof.

As shown in FIG. 8A, each spring member 3B includes a first spring part 31B, a second spring part 32B, and a connection part 33B. The first spring part 31B and the second spring part 32B are opposed to each other. The connection part 33B connects the first spring part 31B and the second spring part 32B.

The first spring part 31B includes a contact portion 31B1 having a curved shape, which is brought into contact with an inner peripheral surface of an opening of a casing C (see FIG. 2), and a flat portion 31B2 which is continuous with a front end of the contact portion 31B1. The contact portion 31B1 is formed with two slots 31B3 extending in the front-rear direction FR.

The second spring part 32B includes a contact portion 32B1 having a curved shape, which is brought into contact with the mating connector 200, a flat portion 32B2 which is continuous with a front end of the contact portion 32B1, a flat portion 32B3 which is continuous with a rear end of the contact portion 32B1, and the two spring member-side protruding portions 32B4 which are continuous with a rear end of the fiat portion 32B3. The contact portion 32B1 is formed with two slots 32B5 extending in the front-rear direction FR. The two spring member-side protruding portions 32B4 are each bent substantially at right angles to the flat portion 32B3 (see FIG. 8A).

A front end of the flat portion 31B2 and a front end of the flat portion 32B2 are connected via the connection part 33B, and the spring member 3B functions as a clip-type leaf spring.

Next, how to assemble the connector cage will be described.

First, the spring members 3B are fitted to the cage body 1 in the following manner:

The two of the spring members 3B are fitted on the upper surface portion 111 of the upper cage part 11, and the spring member-side protruding portions 32B4 are inserted from the inside of the reception portion 1A through the holes 111D of the upper surface portion 111. The one of the spring members 3B is fitted on each associated one of the side surface portions 112 of the upper cage part 11, and the spring-member side protruding portions 32B4 are inserted from the inside of the reception portion 1A through the holes 112C of the side surface portions 112. After that, the leading ends of the spring-member side protruding portions 32B4 of each spring member 3B are bent forward in the front-rear direction FR.

The two of the spring members 3B are fitted on the lower surface portion 121 of the lower cage part 12, the spring-member side protruding portions 32B4 are inserted from the inside of the reception portion 1A through the holes 121B of the lower surface portion 121, and the spring-member side protruding portions 32B4 of each spring member 3B are bent forward in the front-rear direction FR.

Next, the spring member 3A is fitted on the partition body 21 of the partition member 2. At this time, the partition member-side protruding portion 22B of the partition member 2 and the spring member-side protruding portion 31A4 of the spring member 3A are opposed to each other in the left-right direction LR, and the partition member-side protruding portion 22G of the partition member 2 and the spring member-side protruding portion 32A4 of the spring member 3A are opposed to each other in the left-right direction LR.

After that, the partition member-side protruding portions 22A to 22E of the partition member 2 are inserted in the holes 111B1 to 111B5 of the upper surface portion 111 of the upper cage part 11, and the loading ends of the partition member-side protruding portions 22B and 22D are bent substantially at right angles. At this time, the partition member-side protruding portion 22B is bent such that the partition member-side protruding portion 22B is overlaid on the spring member-side protruding portion 31A4. As a result, the partition member-side protruding portion 22B and the spring member-side protruding portion 31A4 are connected to the upper cage part 11. Further, when the leading end of the partition member-side protruding portion 22B is bent at right angles, the leading end of the spring member-side protruding portion 31A4 of the spring member 3A is also bent at right angles, whereby the leading end of the partition member-side protruding portion 22B is overlaid on the spring member-side protruding portion 31A4, so that the spring member-side protruding portion 31A4 is covered by the partition member-side protruding portion 22B, and hence when the upper surface portion 111 of the upper cage part 11 is viewed from above in the up-down direction UD, the spring member-side protruding portion 31A4 cannot be visually recognized.

Next, the partition member-side protruding portions 22F and 22G of the partition member 2 are inserted in the holes 121A1 and 121A2 of the lower surface portion 121 of the lower cage part 12, respectively, and one of the leg portions 23 of the partition member 2 is inserted in the hole 121A3 of the lower surface portion 121 of the lower cage part 12, and at the same time, one of the leg portions 112B of each of the side surface portions 112 is inserted through an associated one of the holes 121C1 of the lower surface portion 121, and the protruding portion 112D of each of the side surface portions 112 is inserted through an associated one of the holes 121C2 of the lower surface portion 121, respectively. Further, the holes 122A of the connection protruding portions 122 of the lower cage part 12 are hooked on the connection protruding portions 112A of the upper cage part 11, respectively, whereby the upper cage part 11 and the lower cage part 12 are connected. At this time, the partition member-side protruding portion 22G of the partition member 2 and the spring member-side protruding portion 32A4 of the spring member 3A are opposed to each other in the left-right direction LR.

After that, the leading ends of the protruding portions 112D of the side surface portions 112 are bent substantially at right angles, and the leading end of the partition member-side protruding portion 22G of the partition member 2 is bent substantially at right angles. At this time, the partition member-side protruding portion 22G is bent such that the partition member-side protruding portion 22G is overlaid on the spring member-side protruding portion 32A4. As a result, the partition member-side protruding portion 22G and the spring member-side protruding portion 32A4 are connected to the lower cage part 12. Further, by bending the leading end of the partition member-aide protruding portion 22G substantially at right angles, the leading end of the spring member-side protruding portion 32A4 of the spring member 3A is also bent at right angles, and the leading end of the partition member-side protruding portion 22G is overlaid on the spring member-side protruding portion 32A4, which causes the spring member-side protruding portion 32A4 to be covered by the partition member-side protruding portion 22G, and hence when the lower surface portion 121 of the lower cage part 12 is viewed from below in the up-down direction UD, the spring member-side protruding portion 32A4 cannot be visually recognized.

Thus, the assembly of the connector cage is completed.

When the connector cage is mounted on the substrate B, the leg portions 112B of the cage body 1 and the leg portions 23 of the partition member 2 are connected to a ground pattern, not shown, of the substrate B.

The connector cage mounted on the substrate B is accommodated in the casing C made of metal. The connector cage is fitted in the opening of the casing C such that the front part of the cage body 1 is exposed outside the casing C (see FIG. 2). At this time, the contact portions 31B1 of the six spring members 3B fitted on the cage body 1 are elastically deformed, and are brought into contact with the inner peripheral surface of the opening of the casing C, and hence the casing C and the cage body 1 are electrically connected via the spring members 3B. Further, when the mating connector 200 is fitted in the connector cage, the spring pieces 111A of the cage body 1, the contact portions 32B1 of the six spring members 3B fitted on the cage body 1, and the contact portions 31A1 and 32A1 of the spring member 3A fitted on the partition member 2 are each elastically deformed, and are brought into contact with an outer peripheral surface of the mating connector 200, and hence the mating connector 200 and the cage body 1 are electrically connected via the spring members 3A and 3B.

As described above, the spring member-side protruding portion 31A4 of the spring member 3A fitted on the partition member 2 is inserted in the hole 111B2 of the upper surface portion 111 of the upper cage part 11, and the spring member-side protruding portion 32A4 is inserted in the hole 121A2 of the lower surface portion 121 of the lower cage part 12, and hence when fitting the mating connector 200 in the connector cage, the mating connector 200 is prevented from being caught by the spring member-side protruding portion 31A4 and the spring member-side protruding portion 32A4 of the spring member 3A.

When the mating connector 200 is fitted in the connector cage, the mating connector 200 is prevented from being caught by the spring member-side protruding portions 31A4 and 32A4 of the spring member 3A, and hence the connector cage according to the present embodiment is advantageous in that the spring member 3A is difficult to be broken.

Further, since the spring member-side protruding portions 31A4 and 32A4 of the spring member 3A and the partition member-aide protruding portions 22B and 22G of the partition member 2 can be connected to the cage body 1 by bending, it is possible to reduce the number of steps for assembling the connector cage.

Further, by enabling both of the spring member-side protruding portion 31A4 and the partition member-side protruding portion 22B to be inserted in the hole 111B2 of the upper surface portion 111, and both of the spring member-side protruding portion 32A4 and the partition member-side protruding portion 22G to be inserted in the hole 121A2 of the lower surface portion 121, the number of holes formed in the cage body 1 is reduced. Therefore, it is possible to reduce the number of steps of assembling the connector cage, and suppress reduction of rigidity of the cage body 1 of the connector cage.

Further, since the leading end of the partition member-side protruding portion 22B of the partition member 2 is overlaid on the leading end of the spring member-side protruding portion 31A4 of the spring member 3A, and the leading end of the partition member-side protruding portion 22G of the partition member 2 is overlaid on the leading end of the spring member-side protruding portion 32A4 of the spring member 3A, it is possible to connect the spring member-side protruding portion 31A4 and the partition member-side protruding portion 22B to the upper surface portion 111 of the upper cage part 11 at the same time, and connect the spring member-side protruding portion 32A4 and the partition member-side protruding portion 22G to the lower surface portion 121 of the lower cage part 12 at the same time, whereby it is possible to reduce the assembly costs of the connector cage, and enhance the fixing strength of the spring member 3A.

Further, when the upper surface portion 111 of the upper cage part 11 is viewed from above in the up-down direction UD, the spring member-side protruding portion 31A4 cannot be visually recognized, and when the lower surface portion 121 of the lower cage part 12 is viewed from below in the up-down direction UD, the spring member-side protruding portion 32A4 cannot be visually recognized, and hence it is possible to protect the spring member-side protruding portions 31A4 and 32A4 from external forces.

Further, since the spring member-side protruding portion 31A4 of the first spring part 31A is connected to the upper surface portion 111 of the upper cage part 11, and the spring member-side protruding portion 32A4 of the second spring part 32A is connected to the lower surface portion 121 of the lower cage part 12, it is possible to enhance the fixing strength of the spring member 3A to the cage body 1.

Furthermore, the spring member-side protruding portion 31A4 extending upward from the rear end of the flat portion 31A3 of the first spring part 31A is connected to the upper surface portion all of the upper cage part 11, the spring member-side protruding portion 32A4 extending downward from the rear end of the flat portion 32A3 of the second spring part 32A is connected to the lower surface portion 121 of the lower cage part 12, and the first spring part 31A end the second spring part 32A are brought into close contact with the partition body 21 of the partition member 2. This makes it possible to positively prevent the spring member 3A from being broken when the mating connector 200 is fitted in the connector cage.

Although in the above-described embodiment, the reception portion 1A is partitioned by the one partition member 2, the reception portion 1A may be partitioned by a plurality of partition members 2.

Further, although in the above-described embodiment, both of the spring member-side protruding portion 31A4 and the partition member-side protruding portion 22B are inserted in the same hole (the hole 111B2), and both of the spring member-side protruding portion 32A4 and the partition member-side protruding portion 22G are inserted in the same hole (the hole 121A2), the spring member-side protruding portion 31A4 and the partition member-side protruding portion 22B may be inserted in respective different holes, and the spring member-side protruding portion 32A4 and the partition member-side protruding portion 22G may be inserted in respective different holes.

Further, although in the above-described embodiment, the spring member-side protruding portion 31A4 is formed on the first spring part 31A of the spring member 3A, and the spring member-side protruding portion 32A4 is formed on the second spring part 32A, the spring member-side protruding portion may be formed on only one of the first spring part 31A and the second spring part 32A of the spring member 3A.

Further, although in the above-described embodiment, the cage body 1 is formed by the upper cage part 11 and the lower cage part 12, the cage body 1 may be formed only by the upper cage part 11.

Figure 9A:
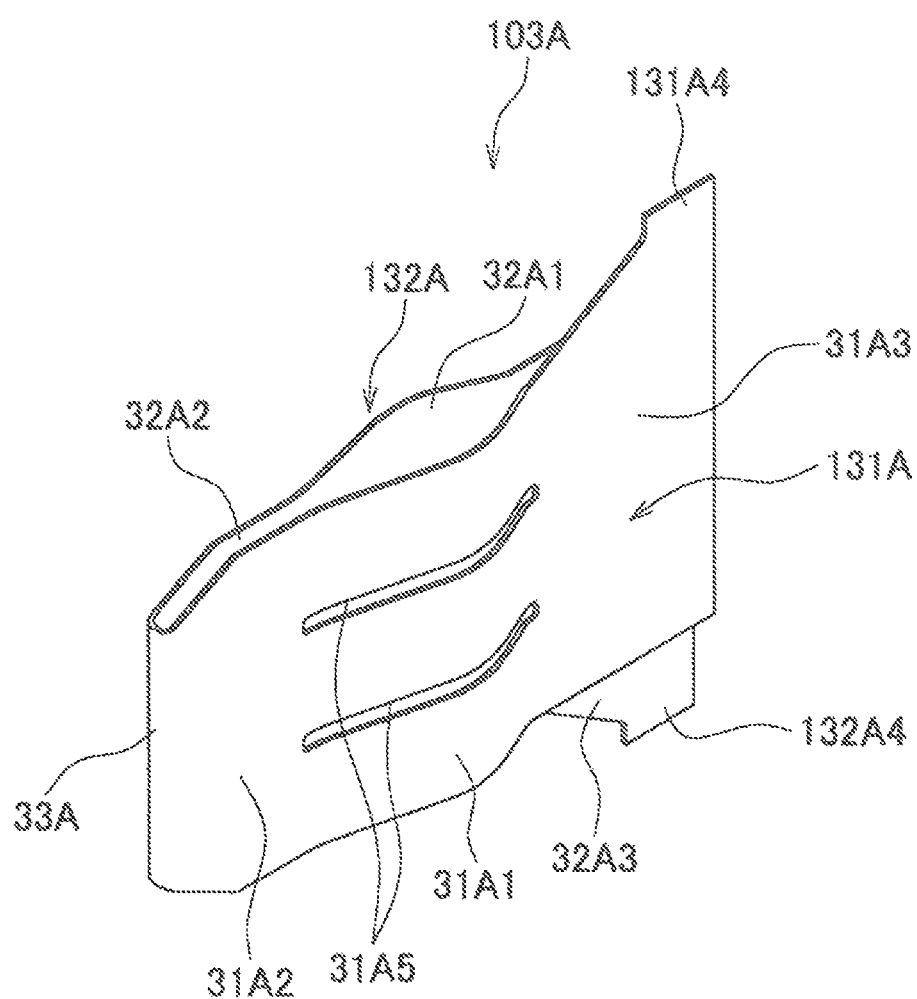
FIG. 9A is an enlarged perspective view of a spring member fitted on a partition member of a connector cage according to another embodiment of the present invention.
Figure 9B:
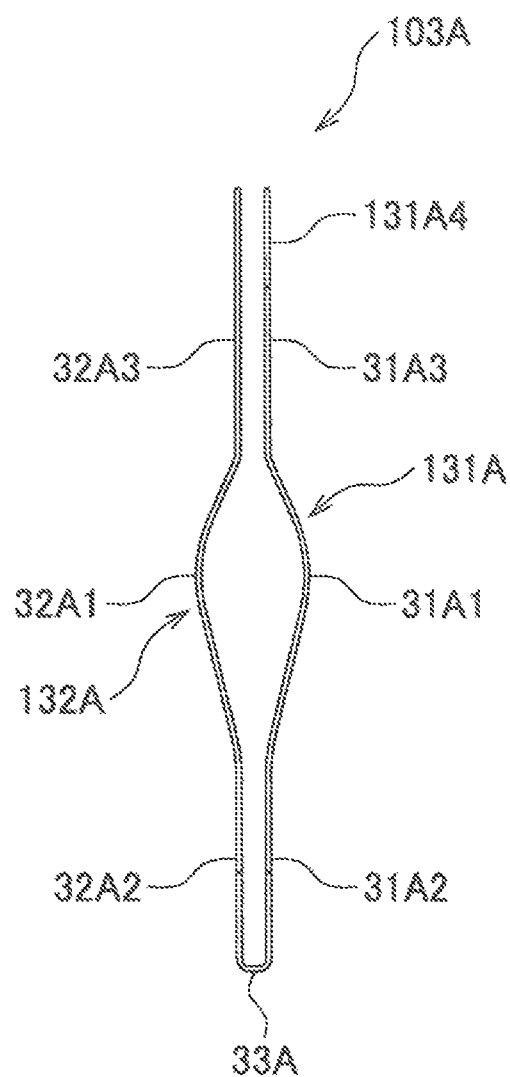
FIG. 9B is a plan view of the spring member shown in FIG. 9A.

Next, a description will be given of a spring member of a connector cage according to another embodiment of the present invention with reference to FIGS. 9A and 9B.

The same components as those of the above-described embodiment are denoted by the same reference numerals, and description thereof is omitted. The following description is given only of a main different point from the above-described embodiment.

The present embodiment differs from the above-described embodiment in the shape of the spring member-side protruding portion of the spring member fitted on the partition member 2. The present embodiment is the same as the above-described embodiment except this different point.

Figure 6B:
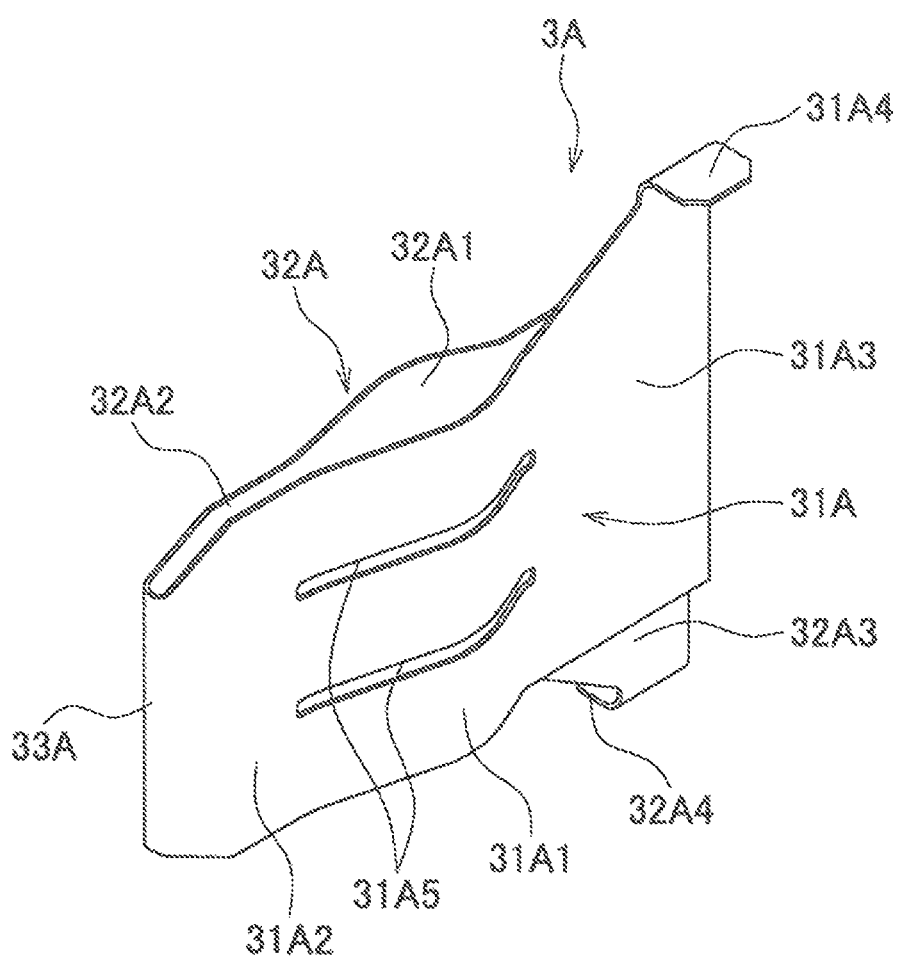
FIG. 6B is an enlarged perspective view of the spring member fitted on the partition member of the connector cage shown in FIG. 1, showing a state after bending the spring member-side protruding portions thereof.

In the above-described embodiment, as shown in FIGS. 6A and 6B, the spring member-side protruding portions 31A4 and 32A4 of the spring member 3A are long. In contrast, in the present embodiment, as shown in FIGS. 9A and 9B, spring member-side protruding portions 131A4 and 132A4 of a spring member 103A are short.

When the spring member-side protruding portion 131A4 of a first spring part 131A is inserted into the hole 111B2 of the upper surface portion 111 of the upper cage part 11, the spring member-side protruding portion 131A4 does not protrude from the hole 111B2, and hence when assembling the connector cage, it is unnecessary to bend the spring member-side protruding portion 131A4. When the spring member-side protruding portion 132A4 of a second spring part 132A is inserted into the hole 121A2 of the lower surface portion 121 of the lower cage part 12, the spring member-aide protruding portion 132A4 does not protrude from the hole 121A2, and hence when assembling the connector cage, it is unnecessary to bend the spring member-side protruding portion 132A4.

The present embodiment provides the same advantageous effects as provided by the above-described embodiment, and eliminates the need of bending the spring member-side protruding portions 131A4 and 132A4 when assembling the connector cage, and hence it is possible to reduce the number of steps of assembling the connector cage.

It is further understood by those skilled in the art that the foregoing are the preferred embodiments of the present invention, and that various changes and modification may be made thereto without departing from the spirit and scope thereof.

What is claimed is:

1. A connector cage, comprising:
   a cage body that has a reception portion for receiving a mating connector therein;
   a partition member that partitions the reception portion in a left-right direction which is orthogonal to a front-rear direction of the cage body; and
   a spring member that is arranged at a front end of the partition member in the front-rear direction, and is brought into contact with the mating connector,
   wherein a first hole is formed which is a through hole extending through the cage body in an up-down direction which is orthogonal to both of the front-rear direction and the left-right direction, and
   wherein the spring member includes a spring member-side protruding portion which is inserted through the first hole, and is connected to the cage body.

2. The connector cage according to claim 1, wherein a distal end of the spring member-side protruding portion, which protrudes from the first hole out of the cage body, is bent.

3. The connector cage according to claim 1, wherein a second hole is formed which is a through hole extending through the cage body in the up-down direction, and
   wherein the partition member includes a partition member-side first protruding portion which is inserted through the second hole, and is connected to the cage body.

4. The connector cage according to claim 2, wherein a second hole is formed which is a through hole extending through the cage body in the up-down direction, and
   wherein the partition member includes a partition member-side first protruding portion which is inserted through the second hole, and is connected to the cage body.

5. The connector cage according to claim 3, wherein a distal end of the partition member-side first protruding portion, which protrudes from the second hole out of the cage body, is bent.

6. The connector cage according to claim 4, wherein a distal end of the partition member-side first protruding portion, which protrudes from the second hole out of the cage body, is bent.

7. The connector cage according to claim 1, wherein the partition member includes a partition member-side second protruding portion which is inserted through the first hole together with the spring member-side protruding portion, and is connected to the cage body.

8. The connector cage according to claim 2, wherein the partition member includes a partition member-side second protruding portion which is inserted through the first hole together with the spring member-side protruding portion, and is connected to the cage body.

9. The connector cage according to claim 7, wherein the partition member-side second protruding portion is overlaid on the spring member-side protruding portion.

10. The connector cage according to claim 8, wherein the partition member-side second protruding portion is overlaid on the spring member-side protruding portion.

11. The connector cage according to claim 9, wherein when the cage body is viewed from the up-down direction, the spring member-side protruding portion cannot be visually recognized.

12. The connector cage according to claim 10, wherein when the cage body is viewed from the up-down direction, the spring member-side protruding portion cannot be visually recognized.

13. The connector cage according to claim 3, wherein the cage body includes an upper wall and a lower wall, and
    wherein the first hole and the second hole are formed in at least one of the upper wall and the lower wall.

14. The connector cage according to claim 5, wherein the cage body includes an upper wall and a lower wall, and
    wherein the first hole and the second hole are formed in at least one of the upper wall and the lower wall.

15. The connector cage according to claim 1, wherein the spring member includes a first spring part and a second spring part, which are opposed to each other with the partition member therebetween, and
    wherein the spring member-side protruding portion formed on one of the first spring part and the second spring part extends upward in the up-down direction, and the spring member-side protruding portion formed on the other of the same extends downward in the up-down direction.

16. The connector cage according to claim 2, wherein the spring member includes a first spring part and a second spring part, which are opposed to each other with the partition member therebetween, and
    wherein the spring member-side protruding portion formed on one of the first spring part and the second spring part extends upward in the up-down direction, and the spring member-side protruding portion formed on the other of the same extends downward in the up-down direction.

17. The connector cage according to claim 15, wherein the first spring part and the second spring part each include;
    a contact portion that is brought into contact with the mating connector, and
    a flat portion which is continuous with a rear end of the contact portion in the front-rear direction, and
    wherein the spring member-side protruding portion is continuous with the flat portion.

18. The connector cage according to claim 16, wherein the first spring part and the second spring part each include:
    a contact portion that is brought into contact with the mating connector, and
    a flat portion which is continuous with a rear end of the contact portion in the front-rear direction, and
    wherein the spring member-side protruding portion is continuous with the flat portion.

19. A connector including a connector cage, wherein the connector cage comprises:
    a cage body that has a reception portion for receiving a mating connector therein;
    a partition member that partitions the reception portion in a left-right direction which is orthogonal to a front-rear direction of the cage body; and
    a spring member that is arranged at a front end of the partition member in the front-rear direction, and is brought into contact with the mating connector,
    wherein a first hole is formed which is a through hole extending through the cage body in an up-down direction which is orthogonal to both of the front-rear direction and the left-right direction, and wherein the spring member includes a spring member-side protruding portion which is inserted through the first hole, and is connected to the cage body.

20. The connector according to claim 19, wherein a distal end of the spring member-side protruding portion, which protrudes from the first hole out of the cage body, is bent.

* * * * *

UNITED STATES PATENT AND TRADEMARK OFFICE
CERTIFICATE OF CORRECTION

PATENT NO. : 10,819,072 B2
APPLICATION NO. : 16/251543
DATED : October 27, 2020
INVENTOR(S) : Yuki Suda et al.

Page 1 of 1

It is certified that error appears in the above-identified patent and that said Letters Patent is hereby corrected as shown below:

In the Specification

Column 4, Line 24, delete "33" and insert --3B--.

Column 5, Line 23, delete "in" and insert --is--.

Column 5, Line 48, delete "o" and insert --a--.

Column 6, Line 55, delete "fiat" and insert --flat--.

Column 7, Line 33, delete "loading" and insert --leading--.

Column 8, Line 19, delete "member-aide" and insert --member-side--.

Column 9, Line 7, delete "member-aide" and insert --member-side--.

Column 9, Line 58, delete "all" and insert --111--.

Column 9, Line 62, delete "end" and insert --and--.

Column 10, Line 58, delete "member-aide" and insert --member-side--.

In the Claims

Column 12, Line 39, delete "include;" and insert --include:--.

Signed and Sealed this
Twenty-third Day of March, 2021

Drew Hirshfeld
*Performing the Functions and Duties of the
Under Secretary of Commerce for Intellectual Property and
Director of the United States Patent and Trademark Office*